US 7,274,378 B2

(12) United States Patent
McAvoy et al.

(10) Patent No.: US 7,274,378 B2
(45) Date of Patent: Sep. 25, 2007

(54) CUSTOMIZED WALL MAP PRINTING SYSTEM

(75) Inventors: John McAvoy, Deerfield, IL (US); Lloyd Wendland, Newport Beach, CA (US); Brian Nguyen, Garden Grove, CA (US); Tara Arnold, Buffalo Grove, IL (US); Alan Yefsky, Hawthorn Woods, IL (US); Polly Greathouse, Libertyville, IL (US); Sean Breyer, Buffalo Grove, IL (US); Barbara Benstead, Morton Grove, IL (US); Ashton Lamont, Kenosha, WI (US)

(73) Assignee: Rand McNally & Company, Skokie, IL (US)

( * ) Notice: Subject to any disclaimer, the term of this patent is extended or adjusted under 35 U.S.C. 154(b) by 194 days.

(21) Appl. No.: 11/057,962

(22) Filed: Feb. 15, 2005

(65) Prior Publication Data

US 2006/0010100 A1 Jan. 12, 2006

Related U.S. Application Data

(60) Provisional application No. 60/592,261, filed on Jul. 29, 2004.

(51) Int. Cl.
*G09G 5/00* (2006.01)
(52) U.S. Cl. ............... 345/629; 715/500; 715/748; 715/968
(58) Field of Classification Search ............... None
See application file for complete search history.

(56) References Cited

U.S. PATENT DOCUMENTS 5,485,174 A * 1/1996 Henshaw et al. ........... 345/684

(Continued)

OTHER PUBLICATIONS

Screen shots of "MapMachine", www.nationalgeographic.com.*

(Continued)

*Primary Examiner*—Mark Zimmerman
*Assistant Examiner*—Enrique L. Santiago
(74) *Attorney, Agent, or Firm*—Marshall, Gerstein & Borun LLP

(57) ABSTRACT

An electronic wall map design and printing system enables a user to select or specify the size, coverage area and detail level of a wall map and to customize the wall map based on the user's needs via a fully automated electronic interface. For ease of viewing during the creation of the wall map, the design and printing system displays the wall map being designed on the electronic user interface at a first detail level or resolution that is less than the level of detail or resolution used to print the wall map. However, the user may use the electronic interface to view portions of the wall map on the user interface at the same level of detail to be actually printed on the wall map to thereby enable the user to assure that the level of detail to be printed on the wall map is adequate for the user's purposes without making the wall map, as printed, hard to read. Once the user has designed the wall map by selecting the size, coverage area, and other customizable features such as titles, specialized icons, etc., the user may have the wall map printed at a printing facility owned by the map provider or may have the wall map sent to and printed by a third party printer such as a copying service located near the user.

56 Claims, 12 Drawing Sheets

U.S. PATENT DOCUMENTS

| | | | | |
|---|---|---|---|---|
| 6,144,956 | A * | 11/2000 | Yajima et al. | 707/3 |
| 6,307,573 | B1 * | 10/2001 | Barros | 715/764 |
| 6,557,006 | B1 * | 4/2003 | Headrick et al. | 707/104.1 |
| 6,912,462 | B2 * | 6/2005 | Ogaki | 701/208 |
| 6,956,590 | B1 * | 10/2005 | Barton et al. | 345/684 |
| 6,999,079 | B2 * | 2/2006 | Kida | 345/427 |
| 7,064,858 | B2 * | 6/2006 | Iwai et al. | 358/1.2 |
| 7,158,878 | B2 * | 1/2007 | Rasmussen et al. | 701/208 |

OTHER PUBLICATIONS

Screen shots of "MAPQUEST", www.mapquest.com.*
Screen shots of "DeliveryMaps", www.deliverymaps.com.*
Screen shots of "Zip Code Maps", www.zipcodemaps.com.*
Zipcodemaps.com and Marketmaps.com wall map printing systems.
Marketmaps.com, Usbusinessinfo.com, and Deliverymaps.com wall map printing systems.
National Geographic map kiosks.
National Geographic Map Machine website.
Thomas Brothers "Express Maps" systems.
Zipcodemaps.com and Marketmaps.com wall map printing systems in use in the U.S. prior to Feb. 15, 2004.
Marketmaps.com, Usbusinessinfo.com, and Deliverymaps.com wall map printing systems in use in the U.S. prior to Feb. 15, 2004.
National Geographic map kiosks in use in the U.S. prior to Feb. 15, 2004.
National Geographic "Map Machine" website in use U.S. prior to Feb. 15, 2004.
Thomas Brothers "Express Maps" system in use in the U.S. prior to Feb. 15, 2004.

* cited by examiner

CUSTOMIZED WALL MAP PRINTING SYSTEM

RELATED APPLICATIONS

This application is a regular filed application of and claims the benefit of priority to U.S. Provisional Patent Application Ser. No. 60/592,261 entitled "Customized Wall Map Printing System," which was filed on Jul. 29, 2004.

TECHNICAL FIELD

This disclosure relates generally to map printing systems and, more particularly, to an electronic map printing system that enables a user to design and print customized wall maps.

DESCRIPTION OF THE RELATED ART

In the art of map making, it is known to store map information in one or more proprietary databases and to then use this map information to print maps of various types and sizes, such as folding maps, atlases, wall maps, etc. Generally speaking, the map information may be stored in one or more databases according to various geographical areas to which the map information pertains, including for example, various countries, states, regions, cities, counties, etc. The stored map information or map data for any particular geographical area is typically highly detailed, and may include data of different types or representing different physical entities, such as highways, main roads, secondary roads, bridges, intersections, train tracks, buildings, points of interest, etc. This map data may also include or represent natural features such as rivers, oceans, seas, beaches, mountains, grade or other cartographic information, etc. In addition to a main icon (such as a line for roads, a square for buildings, etc.), each map entity may include one or more other parameters, such as a title or a name, a font, a relative size, a color, an orientation, etc. associated therewith that determines or specifies the manner in which the map entity will be displayed on a map containing that map entity. As would be expected, the map information for any particular region is stored in the database in a manner that defines the location of each of the map entities relative to the other map entities using, for example, the longitude and latitude each of the different map entities, as well as the relative position or orientation of each of the map entities with respect to the other map entities.

Currently, this map information, once created and stored in the map database(s), is used by a map publisher or other map provider to create and sell maps of various types and sizes. Map providers may provide published maps, which are typically printed in mass lots and are sold through retail outlets, or the map provider may produce custom maps, which are typically printed in a limited number on a special order basis. Examples of published maps may include folding maps, which typically illustrate a single region such as a state, a city, a portion of a city, etc. printed on a larger foldable piece of paper, and atlases and street guides which are typically books of maps having different pages of maps for each of a set of different regions associated with a larger geographic area, such a separate map for each of the states of the United States, or a separate map for each section of a city. Of course, other types of published maps exist. As indicated above, map providers may also use the stored map data to create custom maps for users who have special mapping needs, such as business owners who need a highly detailed map of a region to assist in the operation of their business. One type of map which is often provided as a custom map is a wall map, which is generally a map printed on a single, vary large piece of paper of the size best viewed when hung on a wall. Because wall maps are generally much larger in size than the published maps mentioned above, wall maps are typically able to include more information or map details than traditional published maps, or are able to display the same amount of detail in a manner that does not require looking at different pages of maps.

In one use, wall maps may be of the size and may include a level of detail that makes it convenient to hang the map on a wall and to use the wall map in a local region to assist a business in providing delivery or other services to customers within the local region. For example, businesses which deliver products such as food, packages, etc., or which provide services, such as plumbing, home repair, etc., may use a wall map of a local area being served to enable the drivers or other employees to easily locate a customer's address or to determine the best way of getting to the customer's address quickly and easily before leaving on the delivery or service call.

Due to their size, however, wall maps require special printing equipment which is traditionally only available at the map publisher's facilities (although, more recently, such printing equipment is becoming available for use at specialty printing and copying facilities which provide services directly to the public). None-the-less, in order to obtain a wall map for a particular use, a person desiring a custom wall map (referred to herein as a user) must contact the map publisher or other specialized map provider and must interact with a map provider representative to design and order a wall map customized for the user's needs. In particular, the user must work with the representative of the map provider to determine the area to be covered, the size of the wall map and the particular details that the user wishes to have printed on the wall map, including any custom features, such as indications of user's business address(es), "You Are Here" type messages, logos, radius circles illustrating mileage from a central location, titles, etc. This wall map design process can be time consuming, tedious for the user, and does not allow the user to view the wall map to be created prior to the wall map actually being printed. Further, this procedure relies completely upon the experience of the map provider representative to assure that the final wall map is of a size and illustrates a level of detail that is appropriate for the user's purposes, without having so much map detail that the wall map is hard to read.

SUMMARY

An electronic map design and printing system enables a user to select or specify the size, coverage area and detail level of a wall map and to customize the wall map based on the user's needs via an electronic interface. For ease of viewing during the creation of the wall map, the design and printing system may generally display the wall map being designed on an electronic user interface at a first detail level or resolution that is less than the level of detail or resolution to be used to actually print the wall map. However, the user may use the electronic interface to view portions of the wall map at the same level of detail to be actually printed on the wall map, to thereby enable the user to assure that the level of detail to be printed on the wall map is adequate for the user's purposes without making the wall map, as printed, hard to read. Once the user has designed the wall map by selecting the size, coverage area, and other customizable features such as titles, specialized icons, etc., the user may have the wall map printed at a printing facility owned by or associated with the map provider or may have the wall map sent to and printed by a third party printer such as a copying service located near the user. This electronic wall map design and printing system enables a user to obtain a customized wall map suitable for the user's purposes, enables the user to view the wall map at the same level of detail to be printed on the wall map prior to actually ordering and paying for the wall map, and enables the user to have the wall map printed close to the user or at a printing facility specified by the user, all without having to interface with a map provider representative.

BRIEF DESCRIPTION OF THE DRAWINGS

FIG. 3 is an example screen display associated with a user interface that may be used to select a general wall map area associated with a wall map to be printed;

FIGS. 9-12 illustrate a further set of example screen display images provided to a user on a user interface to assist the user during the process of creating, viewing and ordering a customized wall map.

DETAILED DESCRIPTION

Figure 1:
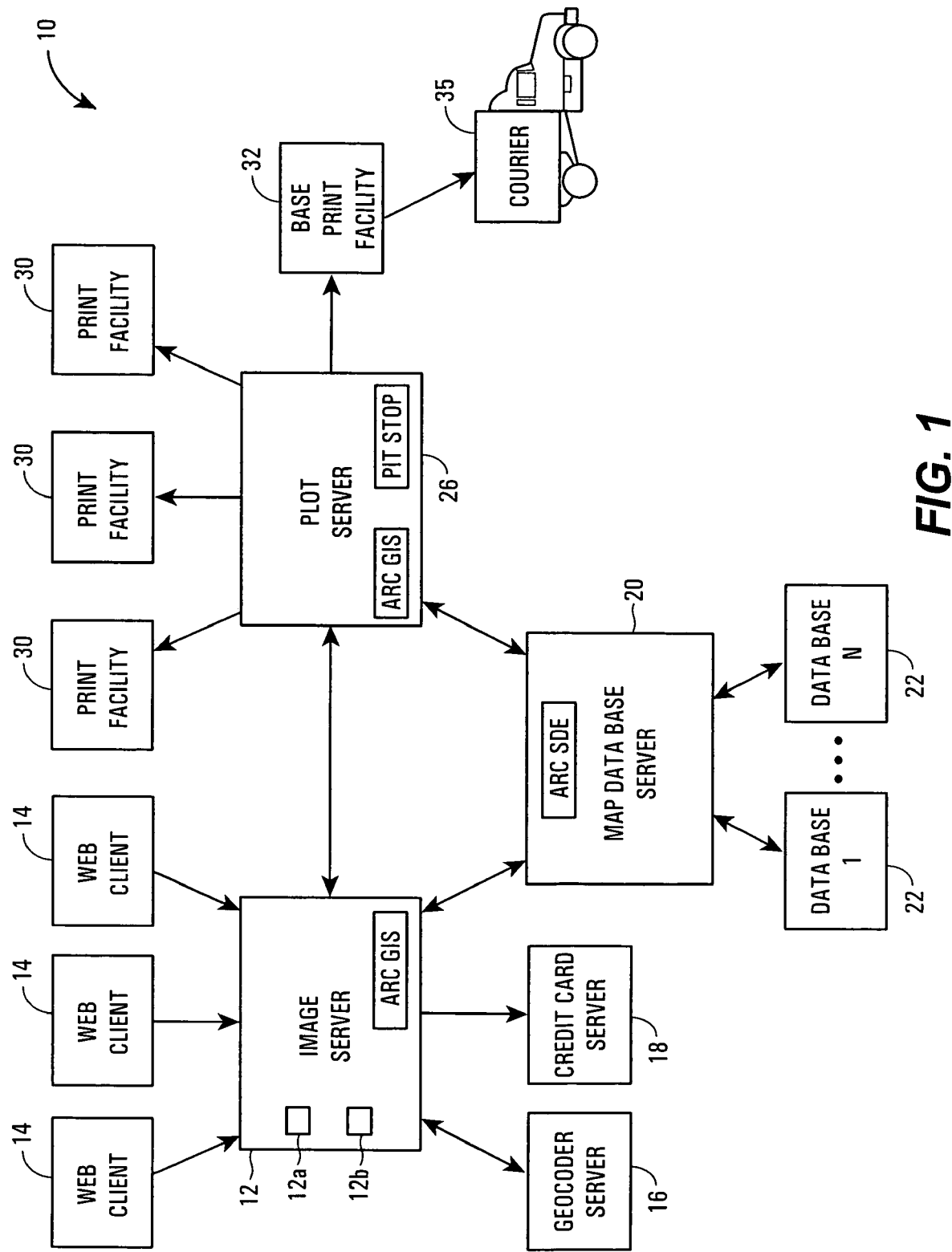
FIG. 1 is an architectural block diagram illustrating components of an electronic wall map design and printing system.

Referring now FIG. 1, an electronic map design and printing system 10 and, in particular, a custom wall map generating system is illustrated. The custom wall map generating system 10 includes an image server 12 connected to various web clients 14 via one or more communication connections which might be, for example, the Internet, the world wide web, a dial up connection or any other suitable public communication network. Generally speaking, a wall map creator (also called a user) will use one of the web clients 14 to interface with the image server 12 to design and print a custom wall map. As a result, the image server 12 interfaces with and sends information to each of the web clients 14 for generating particular wall maps being designed by users at the web clients 14.

Figure 2:
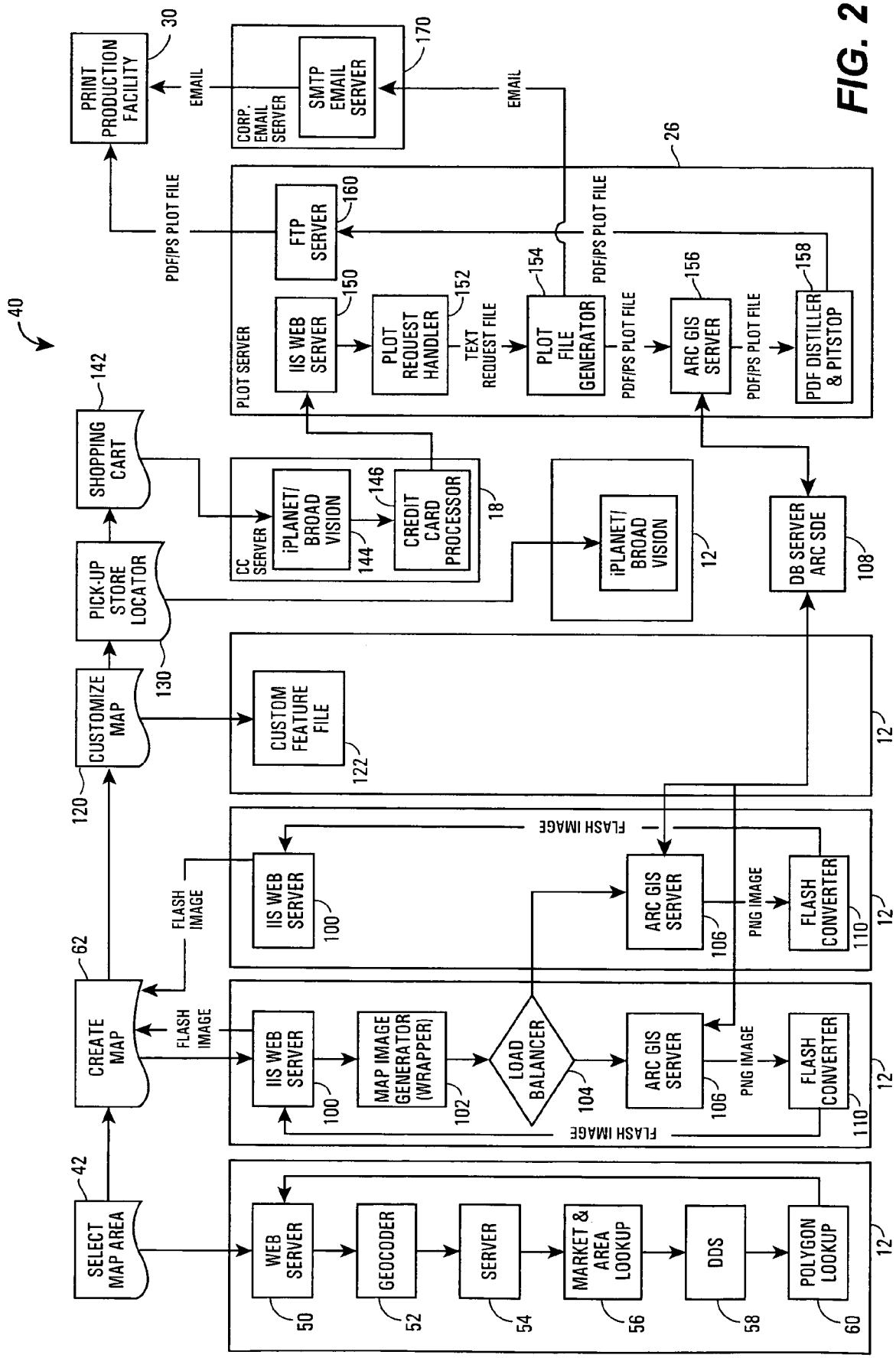
FIG. 2 is a block diagram illustrating additional components of the electronic wall map design and printing system of FIG. 1 in conjunction with a method by which a user uses the wall map design and printing system of FIG. 1 to select, customize and print a wall map.

As illustrated in FIG. 1, and as described in more detail with respect to FIG. 2, the image server 12 is communicatively connected to a number of other components including a geocoder server 16, a credit card server 18 (which may be any typical server or computer system used to implement a standard electronic shopping cart or purchasing system), and a map database server 20. The map database server 20 is connected to one or more map databases 22 which are copied into the map database server 20 and store map data used to generate or create wall maps, as well as other types of maps such as street maps, folding maps, atlases etc. if so desired. The map databases 22 may store map data in any desired format or using and desired storage and retrieval methodology such as those typically used by map providers. Furthermore, the map data may be stored in a single database 22 (or computer memory) or may be stored in multiple different databases located at the same physical place or located at different physical places, such as in different cities, states, etc. In one embodiment, the map data within the databases 22 may be stored on a regional basis, so that a first one of the map databases 22 stores map data for one or more geographical regions while a second one of the map databases 22 stores map data for one or more different regions. If desired, the map data for each region may be stored or configured differently based on, for example, the conventions typically used in the different regions.

As also illustrated in FIG. 1, a plot server 26 is communicatively connected to the map database server 20 and to the image server 12 and, while not shown as such, may also be communicatively coupled to one or more of the geocoder server 16 and the credit card server 18. The plot server 26 obtains a wall map file from or via the image server 12 that defines the parameters of a wall map designed by a user at one of the web clients 14, and uses the wall map file to obtain map data from the map database server 20 pertaining to the wall map which has been created or designed by a user. The plot server 26 then uses the map data to create a wall map print file and communicates with one or more print facilities 30 or 32 to have the wall map print file printed into a wall map and possibly delivered to a user via a courier service 35.

Generally speaking, a user desiring to create a customized wall map will access (or log into) the image server 12 via one of the web clients 14 using any standard internet communication connection. The image server 12 (which includes a processor 12a and a memory 12b) may run a wall map design program (not shown) stored in the memory 12b using the communications from the web client 14 as inputs, to enable the user to design a particular wall map. As part of this process, the image server 12 (and more particularly, the wall map design program) will accept inputs from the user as to the type and nature of the wall map to be created, will interface with the geocoder server 16, the credit card server 18 and the map database server 20 to obtain various types of information or data needed to create and view the wall map being designed and will provide an illustration of the wall map being designed to the user via the web client 14. The wall map design program may allow the user to change the design criteria for the wall map to thereby customize the wall map to best suit the user's needs. Once the wall map is designed (or during the design process), the wall map design program may create one or more map files including the data necessary to specify or define the wall map being designed, such as the size, coverage area, zoom level, etc. of the wall map. This map file does not, however, need to include all of the map data that will be used to actually print the wall map being designed, as this data may be accessed during a later printing step directly from the appropriate map database 22 on the database server 20.

As will be understood, the image server 12 may provide any desired set of user interface displays to the web client 14 to enable the user at the web client 14 to customize the design of a wall map to be printed including, for example, interfaces that allow the user to select the size of the wall map, the area to be covered by the wall map, the level of detail to be shown in the wall map, customized information to be put in the wall map such as particular locations associated with the user (e.g., star icons at business addresses associated with the user), map titles, radius circles centered around a particular address or point on the wall map, etc. As discussed in more detail below, the map design program allows the user to view (on the interface or computer screen at the web client) the wall map being created in at least two different levels of detail. In particular, the wall map may be generally displayed or represented on the user interface at the web client 14 using a first level of detail which does not include all of the detail that will be present on the final wall map as actually printed. This first level of detail or resolution makes it easier for the user to view the wall map on the user interface for the purpose of designing the general characteristics of the wall map, such as selecting the appropriate size, coverage area, titles, etc. This first level of detail or resolution eliminates less important map information to make the wall map, as displayed on the user interface at the web client 14, more understandable and readable to the user. However, the map design program may allow the user to view (via the user interface at the web client 14) portions of the wall map in the level of detail or resolution that will actually be present on the physical wall map as printed. In this manner, the user can be assured that the actual wall map to be printed includes the appropriate level of map detail or map information.

In any event, when a user is satisfied with a particular wall map design, the image server 12 will send the map file (specifying the wall map design parameters such as the wall map size, coverage area, level of detail, customized features, etc.) to the plot server 26. The plot server 26 uses the wall map file to access the map database server 20 which will, in turn, access the appropriate map databases 22 to obtain the map image information to be printed on the wall map according to the design criteria. This map image information will then be used to create a map print file for the wall map, and the plot server 26 will then send this print file to one or possibly more of the print facilities 30 or 32. The print facility 30 or 32 to be used to print the wall map may be specified by the user at the web client 14 and may be, for example, a print location within the coverage area of the wall map, a print location close to an address specified by the user, a print location determined to have the appropriate printing equipment to print the wall map, etc. On the other hand, the user may specify that he or she wishes to have the wall map delivered to the user, in which case, the plot server 26 may send the wall map print file to a base printing facility 32 associated with, for example, a map provider. The base printing facility 32 may then print the wall map as specified by the print file and send the wall map to the user using any desired delivery mechanism, such as a courier (illustrated as a courier 35 in FIG. 1), the postal service, etc. Of course, the system illustrated in FIG. 1 and described further herein may be scalable. Thus, more image servers 12, map data base servers 20 and plot servers 26 can be added as needed.

Figure 3:
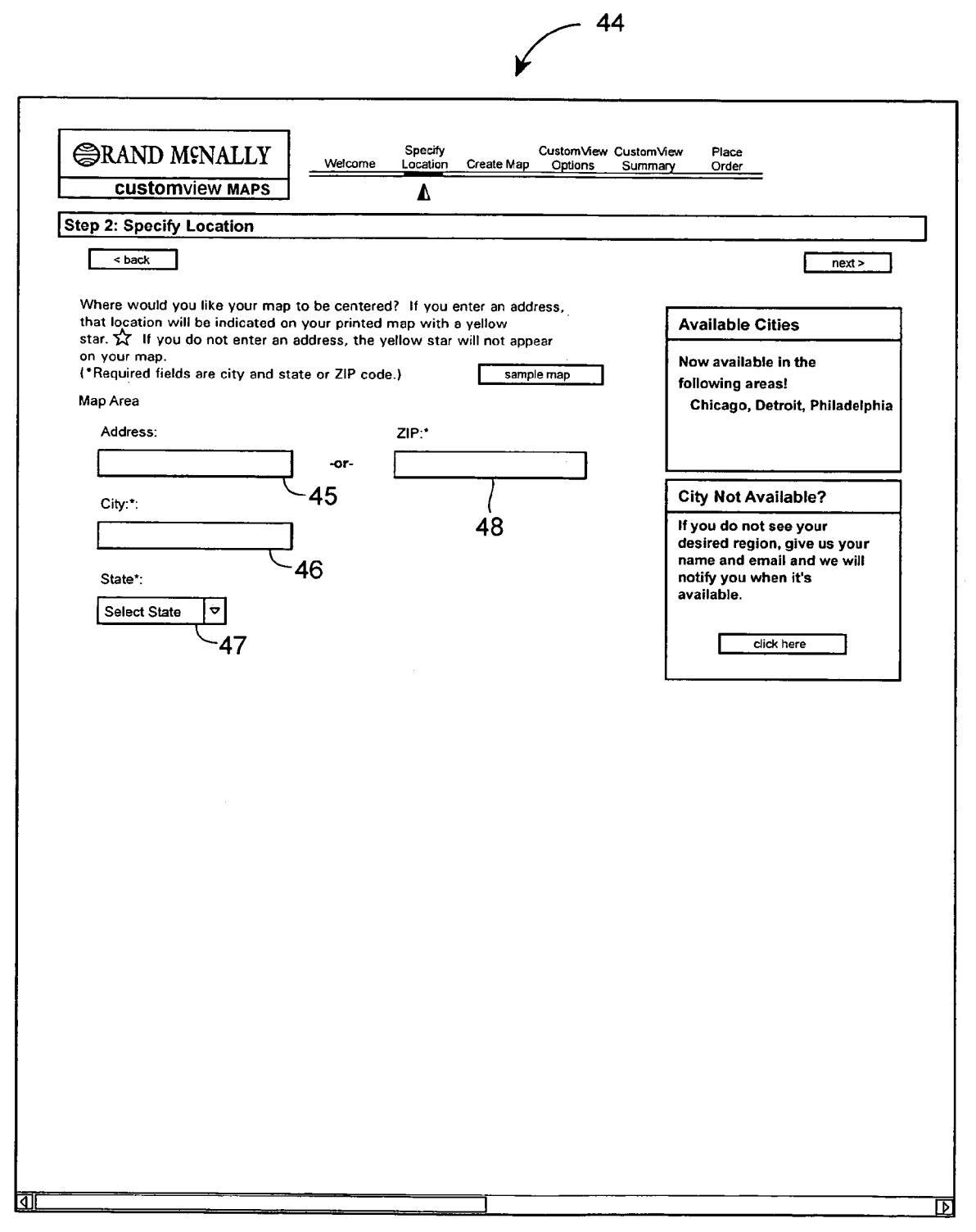

FIG. 2 illustrates a manner in which the different steps of the wall map design and printing procedure are implemented using the system 10 of FIG. 1. In particular, at a block or step 42, a user (at one of the web clients 14 of FIG. 1) logs into the appropriate website hosted by, for example, the image server 12, and selects a map location to be used as a center point of a wall map, or as a general indication of the wall map region or area to be covered. FIG. 3 illustrates an exemplary screen display 44 which may be presented to the user at the web client 14 to allow the user to specify a general map area for which a wall map is to be created. As illustrated in FIG. 3, the user may enter, via appropriate boxes 45-48 a street address, a city and a state (which may be selected by entering or by selecting from a pull down menu) or may enter zip code. Of course, if desired, user may enter any other indication of an address, a region or a geographical location of any kind (such as a city) to specify a starting point for the wall map design, e.g., a location to be contained within the wall map to be designed.

Referring back to FIG. 2, the location specified by the user at the block 42 is provided to the image server 12 which, using the map design program, determines whether map data is stored for the region or area with which the specified location is associated. In particular, a web server 50 (which may use any standard server program and hardware) associated with the image server 12 communicates with the geocoder server 16 (of FIG. 1) and provides the specified address or location thereto. As generically illustrated by the block 52, the geocoder 16 uses any standard or known geocoding technique to convert the address or other location information into a predetermined coordinate system that can be used to locate specific map data within the map databases 22. Thus, for example, the geocoding technique may convert the location information into latitude and longitude coordinates.

As illustrated by the block 54, the geocoder information is then provided via another server 54 to a market and area lookup routine or system 56 which may be stored in any desired server associated with any generalized database. The market and area lookup routine 56 determines the market and/or area associated the latitude and longitude determined by the geocoder 52 and, in effect, determines which map database 22, if any, contains the map data associated with specified location. This map look up step is used to determine whether map data actually exists for the specified address or location. Assuming a market and an area within the market are located based on the geocoded information, the market and area and/or the geocoded information are provided to a DDS program 58, which may be implemented using any known software to convert or interpret the geocoded information, and which operates a polygon lookup program 60. The polygon lookup program 60 determines whether actual map data exists in the appropriate map database 22 (FIG. 1) for the located geocoded information within the located market and area. Generally speaking, the polygon lookup program 60 determines which, if any, of a set of predetermined polygons (which define map boundaries for the map data stored in the map databases 22) contains map data for the latitude and longitude point returned by the geocoder 52 or for the market and area determined by the routine 56. In some cases, the specified location may fall outside of all of the polygons, which means that no map data is stored or is available for the specified location.

If the polygon lookup program 60 determines that the location selected by the user is not a location for which sufficient map data exists, or cannot locate the point selected by the user, the polygon lookup program 60 provides a response back to the web server 50 indicating that a wall map for that location cannot be created. Of course, such a message is sent back to the user and is displayed on the user interface 44 of FIG. 3. In this case, the user may select a different location at which to center a wall map. On the other hand, if the polygon lookup program 60 determines that sufficient map data from which to create a wall map exists for the specified location, the polygon lookup program 60 returns a message to the web server 50, which then causes the user to proceed to the next step 62 (FIG. 2) of electronically designing a wall map. As will be understood, the user interface 44 of FIG. 3 may be used to specify a starting center location of the wall map to be created. However, during the design process, the user may change the center location of the wall map. Furthermore, while the user interface of FIG. 3 allows a user to enter a particular address, a particular address may not be needed and, instead, the blocks 50-60 may operate on the name or location of a city, a town, a region, etc. to determine if sufficient map data exists for that location. If desired, the wall map design program may place a star or other icon on the wall map being created at the address, city, etc. specified by the user when a user specifies a valid address or location.

In any event, at the create map step 62 of FIG. 2, the wall map design program uses the center coordinates specified by the user to select a first set of parameters defining a wall map. These parameters may include the center point (entered by the user via the interface of FIG. 3), the size of the wall map (i.e., the physical size of the wall map as printed), the coverage area of the wall map (i.e., the boundaries of the map data to be printed on the wall map), the orientation of the wall map, the zoom level of the wall map, etc. Such parameters may be selected based on preset or default parameter settings stored within the image server 12 or at the web client 14 or may be initially specified by the user. In any event, the wall map design program uses the initial center location as specified by the user and the default or initial parameter settings to create a first wall map file. A low resolution depiction of the wall map specified by this wall map file is then presented to the user via the user interface at the web client 14. Upon viewing the low resolution depiction of the wall map, the user may make changes to the wall map parameters to alter the wall map to cover a different location, to cover more or less of a geographical region, to include more or less map detail information, to move the center point of the wall map, to change the physical size or orientation of the wall map as printed, etc.

Figure 4:
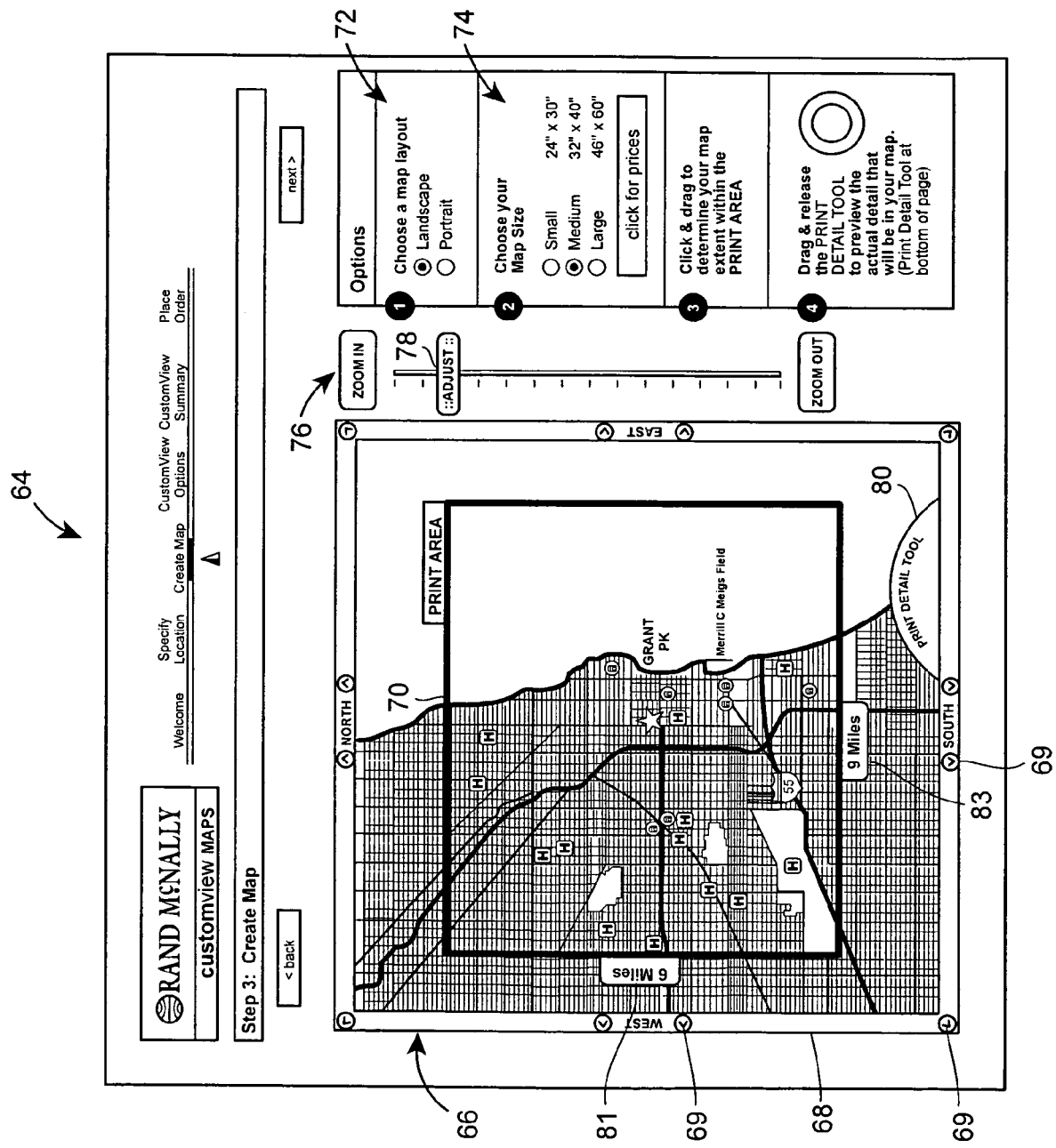
FIG. 4 is an example screen display associated with a user interface that may be used to create, view and modify a wall map to be printed.

FIG. 4 illustrates an example entry screen display 64 which allows a user to view a depiction of a wall map being created and to select or specify wall map parameters associated with the wall map being created. As illustrated in FIG. 4, the screen display 64 includes a map area 66, in this case illustrating Chicago, Ill., bounded by an outer box 68 having arrows 69 thereon pointing to directions such as north, south, east, west, northeast, northwest, southwest and southeast. Furthermore, an inner box 70 illustrates the actual area to be covered by the wall map as currently designed (or as currently specified in the wall map file). Control and selection boxes on the right side of the display 64, which maybe used in any order, enable the user to customize the wall map design. For example, the user may use a map layout box 72 to choose the orientation of the wall map to be either landscape or portrait, and may use a sizing box 74 to select the actual printed size of the wall map being designed. Additionally, the user may use a slider control 76 with a slider button 78 to adjust the magnification (also called zoom or scale) of the wall map. By adjusting the slider button 78 up or down, the zoom of the inner box 70 may be changed to cover more or less geographical area. In one embodiment, the slider control 76 will alter the level of map detail to actually be printed on the wall map in a manner described in more detail below.

The user may also pan the area to be viewed or covered by the wall map boundary 70 by pressing the buttons 69 on the outer box 68, which moves the entire wall map area 70 in a specified direction such as north, south, east or west or a combination of these such as, north and west or north and east, etc. In addition, the user may move the map beneath the inner box 70 to change the area within the wall map boundary 70 by clicking and dragging any section of the map viewable within the outer box 68 until the desired portion of the map is contained within the boundaries of the inner box 70. As illustrated in FIG. 4, the inner box 70 specifies the print area of the wall map being designed and includes indications of the vertical scale 81 and the horizontal scale 83 of the wall map. Thus, the wall map defined the by box 70 of FIG. 4 is configured to cover a six mile by nine mile rectangle. Of course, adjusting the slider 76 changes the scale covered by the wall map (e.g., if the slider button 78 is moved towards the zoom out position, the map scales 81 and/or 83 will increase).

Figure 5:
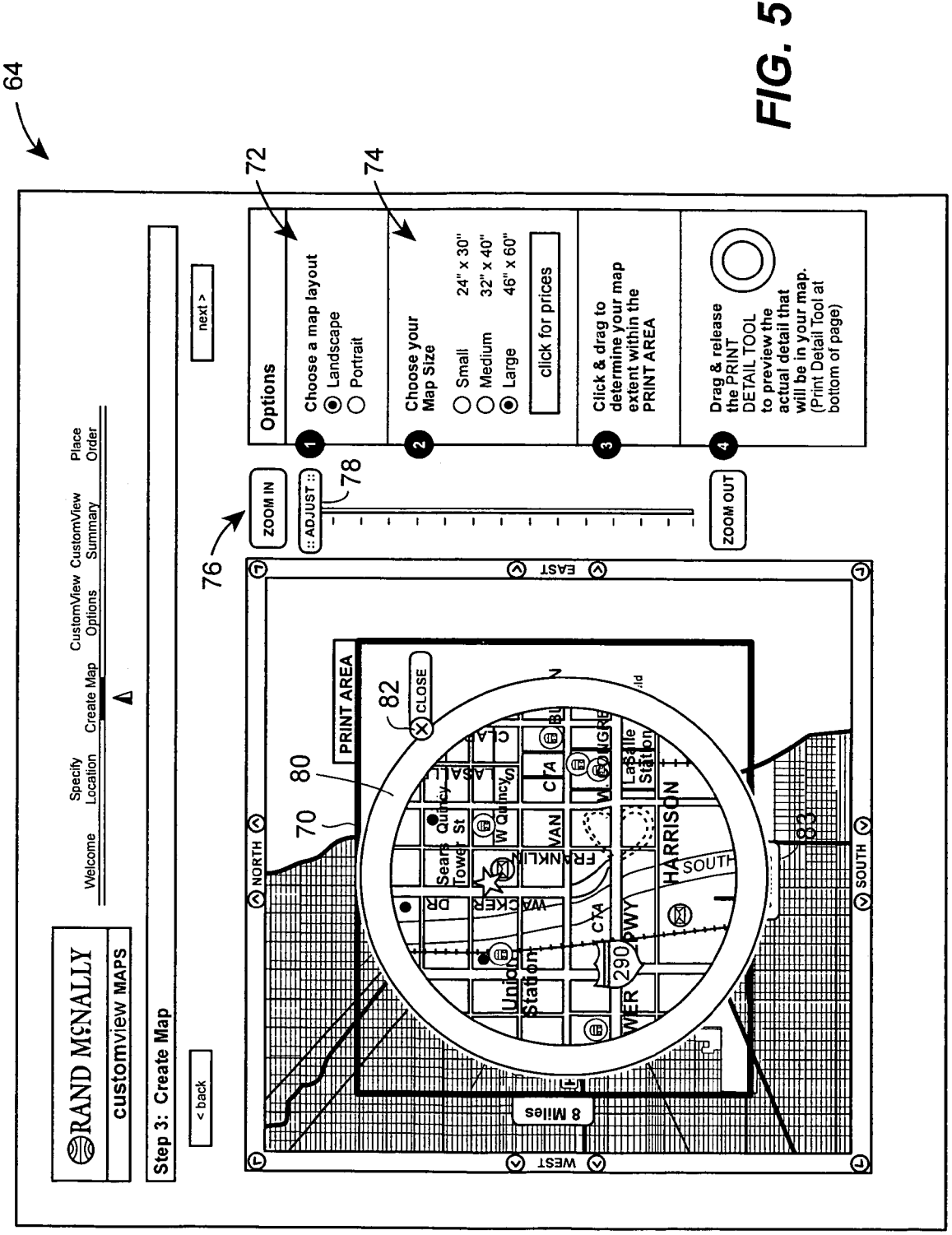
FIG. 5 is an example screen display associated with a user interface that may be used to view a portion of a wall map being created at the same level of detail or resolution that is to be printed on the wall map.

The actual map details specified or displayed within the screen display 64 and, in particular, within the inner box 70, are less than the entire set of map details which would actually be printed on the wall map being designed. This is desirable because the size of the computer screen at the web client 14 (FIG. 1) is too small to show all of the map details within the inner box 70. However, it is also desirable to allow the user to view a representation of the actual details which will be present on the wall map as printed. To do so, a print detail tool 80 is provided which the user may use to display the actual map details which will appear on a printed wall map of the selected size. The print detail tool 80, which in this instance looks like a doughnut, may be dragged by the user to a portion of the wall map as displayed within the box 68 for which he/she would like to view the actual details to be present on the printed wall map. The doughnut shape of the map detail tool 80 allows the user to target a specific area and, once the user has positioned the map detail tool 80 over the specific area, the map detail tool 80 activates and expands as illustrated in FIG. 5 to show a representation of the actual details which will be printed at the specific area on the wall map as currently designed. A close button 82 may be provided on the print detail tool 80 to enable the user to close the print detail tool 80 and thereby return to a screen similar to that of the screen 64 illustrated in FIG. 4. Otherwise, the user may move the print detail tool 80 to different sections within the inner box 70 to view further map details within the wall map boundaries 70. Of course, each time the user uses the print detail tool 80, the map design program will actually obtain the print details from the map database 22 and display them on the user interface. As will be understood from FIG. 5, the print detail tool 80 only shows the map details for a small portion of the wall map defined by the inner box 70 as the computer screen is not large enough to show the map details for all, most or even a large section of the wall map.

It should be noted that the identity of the actual map details to be printed on a wall map of the selected size (and which will thus be viewable via the print detail tool 80) may be dependent on the actual size and zoom level or scale specified for the wall map. In other words, the map details that will be present within the printed wall map are dependent upon the zoom (or scale) specified by the slider control 76 and/or upon the wall map size selected by the user using the control boxes 74. In particular, the wall map may be printed in such a way as to declutter the printed details and in doing so, the wall map may be easier to read. One way to accomplish decluttering may be to group each of the map details or components stored in a map database into categories and to assign priority numbers to each category. There-after, each of the categories could be assigned to a range of map sizes and/or scales based on its priority level. For example, in one embodiment, 15 map detail categories could be used to rank map details in priority order, and with the lower detail category numbers (1, 2, etc.) being associated with more important features such as major roads, rivers, interstates, etc. and the higher detail category numbers (e.g., 14, 15) being associated with details of lesser and lesser importance such as points of interest, particular buildings, etc. Then, as the scale of the wall map decreases (covering more of a geographical area) for a wall map of a given physical size, fewer and fewer categories of details may be printed, with the lower priority detail categories being eliminated before higher priority detail categories. Using this system, the smallest scale wall maps (covering the largest area) may only print the bottom three or four map detail categories (levels 1, 2 and 3), while the largest scale maps may print all 15 map detail categories (levels 1-15).

Alternatively, different levels or amounts of map detail may be associated with more than one zoom level, so that maps of different zoom or scale levels may contain the same map detail or category content, just printed at different scales. In one example, there may be two categories of map detail content available in the system with a number of different zoom or scale levels for each category. For example, zoom levels 1-4 may provide one category of map detail content (printed at four different scales) and levels 5-15 may provide another, more detailed, category of map detail content (printed at 11 different, larger scales). In this case, more map detail content is added only when going from zoom level 4 to zoom level 5. Of course, the system may include any number of categories of map detail content (other than two different categories) and may provide any desired number of zoom or scale levels associated with any particular map detail category.

In any event, depending upon the zoom (or scale) and/or size of the wall map, as specified by the user, a particular level of detail such as, for example, level 8 may be used and any map details ranked into categories 1 through 8 will be printed on the actual wall map while details associated with levels 9 through 15 will not be printed. Of course, the manner in which each of the particular map detail categories 1 through 15 is associated with the zoom (or scale) or wall map size may be stored as a set of rules or otherwise predetermined by the map provider to produce the best or most readable wall maps based upon the zoom and size of the wall map. If desired, the wall map design program may be configured to allow a user to select which map detail categories he or she would like printed on the wall map. Thus, for example, a user may want a wall map with the most important map details (such as detail levels 1-5) but may also be interested in showing tourist attractions, which may be categorized in map detail category 10. In this case, the user may specify that map detail categories 1 through 5 and map detail category 10 should be printed on the wall map, while map detail categories 6 through 9 and 11 through 15 should not be present on the printed wall map.

Referring again to FIG. 2, during the step of creating the wall map 62, as described in detail above with respect to FIGS. 4 and 5, the web client 14 at which the user is located communicates with the image server 12 to obtain image data for display to the user, as well as to inform the wall map design program running within the image server 12 of changes to the wall map design parameters. In particular, each time a user uses the interfaces of FIGS. 4 and 5 to change the wall map design, such as by selecting a different wall map size or orientation, moving the boundaries of the wall map to a different location (thereby changing the center point of the wall map) or using the print detail tool 80 to view actual details of the wall map to be printed, the web client 14 communicates with the server 12. As illustrated in FIG. 2, an IIS web server 100 within the server 12 receives new wall map design parameters (or a request for additional detail information by the detail tool 80) based on user operations at the interface 64. The wall map design program running on the server 12 creates a new map file with these wall map design parameters and operates to generate a new image for display to the user on the interface screen 64. As part of this image generation procedure, the web server 100 provides the new wall map design parameters (or a specification of the area for which the map details are to be displayed) to a map image generator 102 which operates to generate a map wrapper file specifying the map details needed to create a display within the user interface 64 based on the user's operations. Depending upon the number of requests or users logged onto the server 12 at any particular time, a load balancer routine 104 within the server 12 may balance loads by requesting that different map wrapper files be sent via different physical servers. Two such servers 12 are illustrated in FIG. 2, although any other desired number of servers could be used instead. In any event, the load balancer routine 104 sends the map wrapper file to the map database server 20 (FIG. 1) via an ARC GIS server 106, which is a known or standard server component. As illustrated in FIG. 2, the ARC GIS server 106 may communicate with an ARC SDE server 108 within the database server 20 and the ARC SDE server 106 may communicate with the appropriate map database 22 (FIG. 1) to obtain the map information needed (as specified by map wrapper file). Of course, depending upon whether the user makes changes to the map boundary 70 (FIG. 4) or uses the map detail tool 80 (FIG. 5) to request more information, the map image generator 102 will specify different levels of detail to be sent from the map database server 20.

As will be understood, and as discussed with respect to FIG. 1, the map database server 20 takes the request sent to via the ARC SDE server 108, obtains the requested information from the appropriate map database 22, which resides on the map database server 20, and sends the geographic data to the ARC GIS server 106, within the image server 12, which renders the geographic data into a map image in a PNG format. At the image server 12, a flash converter routine 110 converts the PNG image to a micro-media flash image for ease of use and display at the web client 14 and the IIS web server 100 then sends this flash image back to the web client 14 for display to the user. If as illustrated in FIG. 2, multiple ARC GIS servers 106 are used for multiple requests, multiple IIS web servers 100 and flash converters 110 may be used to communicate to the web clients 14 connected to the image server 12.

In any event, using the interfaces 64 of FIGS. 4 and 5, the user interacts with the image server 12 to design and view a wall map. When the user is satisfied with the size, coverage area, etc. of the wall map, the user may, at a block 120 of FIG. 2, customize the wall map by specifying other features to be printed on wall map, which features are not stored or obtained from the map data stored in the map databases 22. Such custom features may include, for example, indications of icons to be located at specific addresses at which, for example, the user may have preferred customers, may have business locations etc., titles to be printed on the wall map, radius circles indicating mileage from a specific point or specific points on the wall maps, logos or messages, such as "You Are Here" messages, etc. As part of the customized options, the user may specify whether the wall map is to be printed with grid lines and/or page numbers. Still further, if desired, the user may change map details that would normally be printed on the wall map using default settings from the map databases 22 and may, for example, change colors, sizes, fonts, type styles, etc. associated with certain map features or map details. While not illustrated in FIGS. 4 and 5, any desired user interface or screen display could be used to enable the user to specify the custom features to be printed on the wall map designed at the block 62 and to then view the specified custom features using the print detail tool 80. As illustrated in FIG. 2, a custom feature file program 122 may be used to create a custom feature file specifying the custom features added by the user via the user interface at the web client 14. Of course, such custom features may include any of the features discussed above or any other desired features to be added to the wall map when printed.

As indicated by the block 130 of FIG. 2, after customizing the wall map, the user may then select or choose a location at which the wall map is to be printed and a manner in which the printed wall map is to be delivered to the user. In particular, the user may specify whether the wall map as designed in the blocks 42, 62 and 120 is to be printed and delivered to the user via a courier or other delivery service, or whether the wall map is to be printed at a local third party print facility or other copying/printing provider and to be picked up by the user.

Figure 6:
FIG. 6 is an example screen display associated with a user interface that may be used to select a pick-up location or delivery method for the wall map being designed.

FIG. 6 illustrates an example screen display 135 which may be used to enable a user to specify whether grid lines and pages numbers are to be printed on the wall map and to enable a user to select a printing location and a delivery mechanism for the wall map designed by the user. As illustrated in the top portion of the screen display 135 of FIG. 6, the user may use check boxes to select whether page numbers and grid lines are to be printed on the wall map, whether page numbers only are to be printed on the wall map or whether neither pages numbers or grid lines are to be printed on the wall map. Additionally, the user may use a check box 136 to specify printing features, such as whether the wall map is to be laminated.

Figure 7:
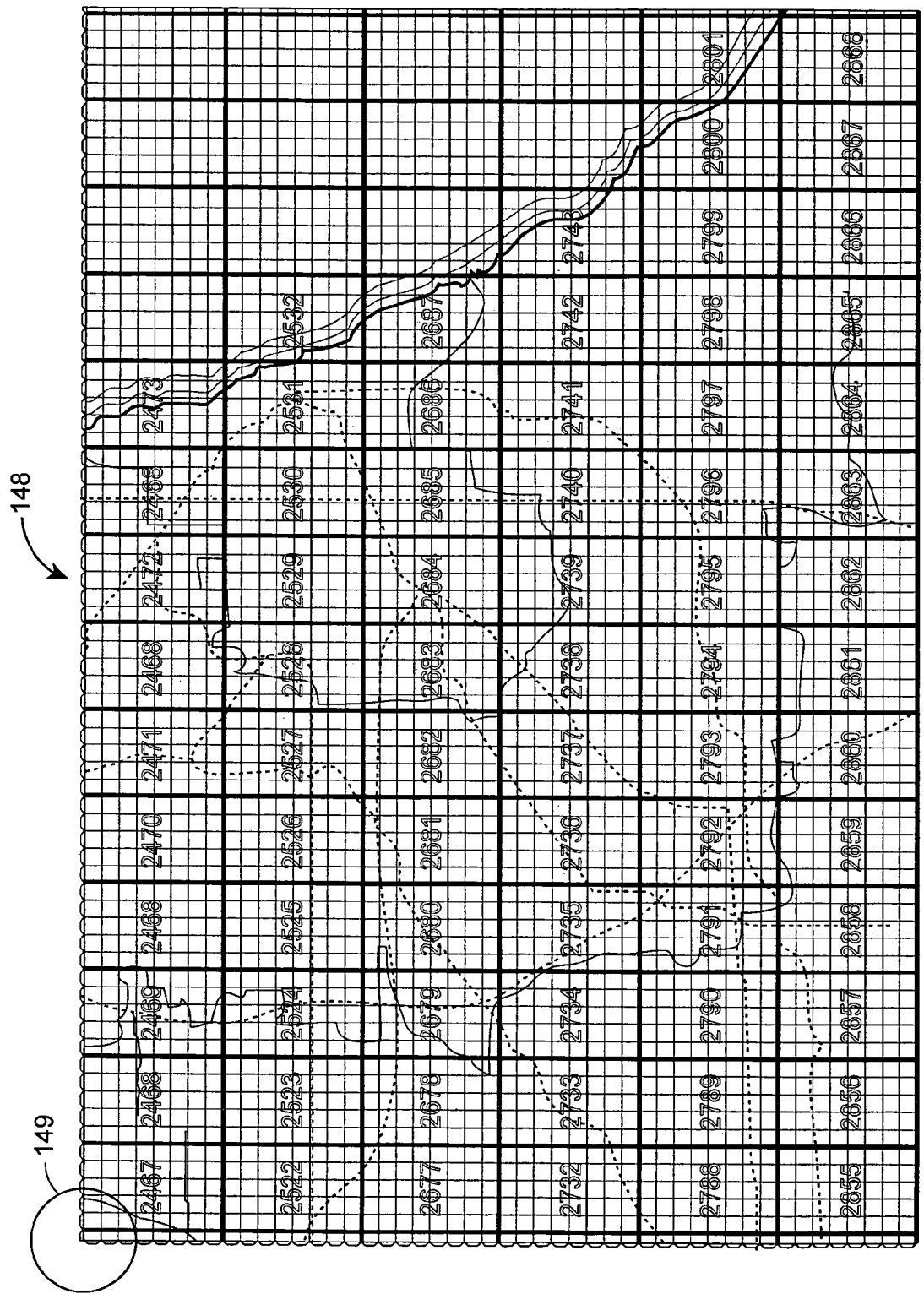
FIG. 7 illustrates a wall map having grid lines and page numbers associated with or corresponding to pages of a published map product, such as a street guide.
Figure 8:
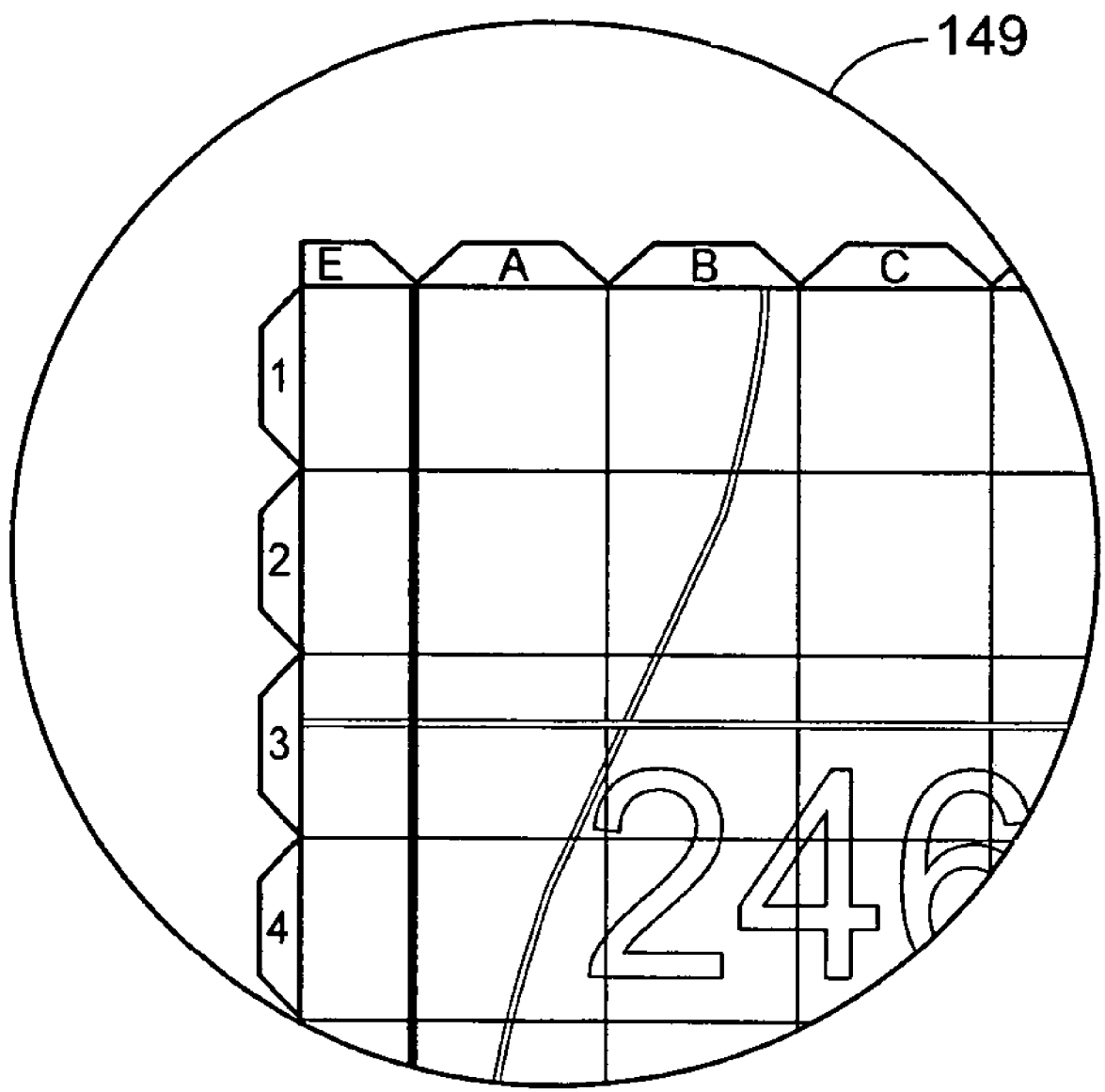
FIG. 8 illustrates an expanded portion of the wall map of FIG. 7.

It should be noted that, in the example described herein, the wall map is created using map data that is used for other printing other commercial or published map products, such as street guides, atlases, etc. As a result, the wall map may be printed in an manner that illustrates not only grid lines to help a user read the map, but having indications of pages or cross-references to pages of published maps to thereby enable cross referencing to maps that are published and readily available at local stores. FIG. 7 illustrates a wall map 148 with grid lines and page numbers printed thereon. If desired, the page numbers (in this case illustrated in a grayed out manner) may correspond to pages of a previously or independently printed or published map or map book. Of course, the grid lines and reference numerals (illustrated in more detail in the blown up section 149 illustrated in FIG. 8), may be used to help locate specific points on a map in conjunction with an index printed for the map. When the page numbers corresponds to a previously published map or set of maps, the published maps may be used in conjunction with the custom wall map to assist users, who can take the published maps on a service call while referencing the wall map when at the location at which the wall map is hung. Thus, the customized wall map may be easily cross referenced to other published maps produced by the map provider so that the wall map can actually correspond, on a page by page basis, to actual pages of maps published and sold independently of the wall map. (It will be understood that, in most instances, the page numbers or page grids printed on the wall map will not line up with the edges of the wall map because the page numbers are defined independently from the edges of the wall map). Such page number and grid information may be stored and obtained from the database 22 or from the database server 20 of FIG. 1.

Furthermore, if desired, once the wall map is created or designed, the wall map design program may automatically create one or more indexes for the wall map indexing the data (locations, etc.) viewable within the wall map. These indexes may include any desired data such as, the location of points on the map as referenced by the grid lines, distances between various points on the map, the customized features or points indicated by the user to be printed on the wall map, etc. Still further, these indexes may correspond to or align with indexes of other published map products illustrating regions or locations covered by the wall map.

Referring again to FIG. 6, the user may use check boxes designated by the reference number 137 to specify whether the wall map is to be delivered via a courier or to be printed out at a specified print facility and picked up by the user. If the user selects to have the wall map printed at, for example, a local print facility, possible choices may be displayed in the box 139, and the user may highlight or click on one of the facilities listed in the box 139 to select that print facility as the facility that is to print the wall map. The display box 139 may be used to display all of the printing facilities that are available to print the wall map, or the display box 139 may display a subset of the possible print facilities, such as the print facilities within the area defined by the wall map to be printed, within a specified distance from the user's location or from an address specified by the user, etc. Of course, information about the possible print facilities may be stored in a file on, for example, the image server 12 and this file may be accessed to determine the printing facilities at which the wall map may be printed. (i.e., to be listed in the box 139 of FIG. 6). If desired, the print facilities listed in the box 139 may be chosen based on either or both of location of the print facility as well as the printing capabilities or printing equipment at the print facilities. Thus, in some cases, the user may specify a wall map having characteristics that require printing equipment (such as laminating equipment, printing equipment for printing larger wall maps, etc.) that may not be present at each printing facility. In this case, the wall map design program may select the printing facilities to be listed in the box 139 as only those having the proper equipment to print the wall map, as designed by the user at the blocks 42, 62, 120 and 130. As illustrated in FIG. 2, the image server 12 may use an iplanet/broadvision component stored on the credit card server 18, which is a known server program, to store all of the potential printing facilities and to determine whether particular printing facilities are in the correct geographical area and/or have the proper printing equipment to print the wall map specified by the user.

Of course, in the case in which the user chooses that the wall map is to be delivered to the user via, for example, a courier service, the wall map design program may automatically specify that the wall map is to be printed at a default printing facility, such as one associated with the map provider (illustrated in FIG. 1 as the base print facility 32). In this case, the base print facility 32 may be used to print the wall map and a courier service 35 may deliver the wall map directly to the user.

After the user specifies a print facility and delivery method at the block 130, the user may be transferred to a typical or standard shopping cart system which allows the user to purchase the wall map designed at the blocks 42, 62, 120, and 130. Such a shopping cart procedure, which is illustrated by the block 142 of FIG. 2, may use an iplanet/broadvision component 144 and any credit card processing software 146 located in the credit card server 18 of FIG. 1 to perform standard charging and order completion procedures for the wall map. Of course, the shopping cart routine 142 may allow the user to buy other products from the wall map provider, such as other maps and associated products.

After the user has actually purchased the wall map to be printed using the shopping cart procedure at the block 142, the credit card server 18, which may be encompassed within or which may communicate through the image server 12, notifies the plot server 26 of FIG. 1 that a proper wall map order has been placed and that printing is needed. At this time, the image server 12 using a communication connection illustrated by a dotted line between the image server 12 and the plot server 26 of FIG. 1, sends the wall map file (including any customized features file) to the plot server 26 to be used by the plot server 26 to create a map print file having all of the image data to be printed on the wall map. As indicated above, the wall map file generated within the image server 12 contains a specification of the wall map parameters defining the printing area, level of detail, print size, etc. of the wall map as well as files or data specifying customized information to be printed on the wall map, such as customized titles, icons, logos, etc., printing features, whether to print grid lines and page numbers, whether to laminate the printed wall map, a list or specification of any indexes to be created for the wall map, an indication of the printing facility to be used to print the wall map, etc.

As illustrated in FIG. 2, the plot server 26 receives the wall map file via an IIS web server 150. While the server 150 is illustrated as being connected directly to the credit card server 18, which in this case is handling the shopping cart program, the IIS web server 150 may receive the wall map file directly or indirectly from the image server 12. The IIS web server 150 associated with the plot server 26 hands off the map request (and the associated wall map file) to a plot request handler 152, which parses the wall map file and sends a text request file to a plot file generator 154 requesting that a plot or print file be created for the wall map based on the information within the wall map file. The plot file generator 154 creates a base PDF/PS plot file and specifies the nature of and the extent of the wall map to be created (as determined from the wall map parameters specified in the wall map file) and accesses the actual map data to be used to generate the wall map via an ARC GIS server 156 associated with the plot server 26. The ARC GIS server 156 communicates with the ARC SDE sever 108 within the map database server 20 to obtain the appropriate map data from the appropriate map database 22. Of course, the ARC GIS server 156 may communicate with the ARC SDE server 108 in the same or similar manner as communications between the ARC GIS server 106 within the image server 12 to obtain the specified wall map information.

In any event, the ARC GIS server 156 provides a complete PDF/PS plot file having all of the needed data for the designed map file therein. As will be understood, the plot file generator 154 operates in conjunction with the ARC GIS server 156 to merge the wall map detail data delivered from the database server 20 (FIG. 1) with the customized information specified by the user at the step 120 (FIG. 2) to create a single PDF/PS plot file defining the wall map to be created.

As illustrated in FIG. 2, the PDF/PS plot file is delivered to a PDF distiller program 158 which processes the PDF/PS plot file image to create a high quality viewable wall map image in the form of a PDF/PS print file based on the printing equipment to be used to print the wall map as well as other information about the wall map. As part of this process, the PDF distiller program 158 may use the PitStop software, which is a commercially available software program, to create or process the PDF/PS plot file image using any standard or known pre-press techniques (e.g. overprinting, transparency or spot color). The PDF print file is then provided to an FTP server 160 which sends the processed PDF print file to a print facility 30 or which makes the processed PDF print file available for download to a print facility 30. The print facility 30, using Adobe Acrobat® software which is a commercially available software program, may facilitate printing maps on different printers with different (varying) size output and different specifications for print resolution (e.g. dots per inch), media types, color systems, and ink types based on, for example, the region covered by the map, the printer being used to print the map, user specifications, etc.

Again with respect to FIG. 2, the plot file generator 154 may also create an e-mail to be sent to the print facility 30 which has been selected or specified to print the wall map. This e-mail, which may include information about the customer, information needed to retrieve the PDF/PS print file from the FTP server 160, billing information, printing requirements, delivery requirements, etc., is then sent to the print production facility 30 via a corporate e-mail server 170. As will be understood, this e-mail notifies the print production facility that the order for the wall map has been placed and that the PDF/PS print file is available on the FTP server 160 for downloading to the print production facility 30 when the print production facility 30 wants to print the wall map. Upon receiving the e-mail notification, the print production facility 30 may log onto the FTP server 160 to acquire the PDF/PS print file or the FTP server 160 may spool the PDF/PS print file to the print production facility 30 automatically. In any event, the printing facility uses the PDF/PS print file and if necessary, information within the e-mail to print the wall map as designed by the user. After printing has occurred, the user may either pick up the wall map at the print production facility 30 or the print production facility 30 may ship the wall map to the user using any desired delivery mechanism such as a courier 35 (FIG. 1) depending upon the manner in which delivery of the wall map was specified by the user at the block 130.

FIGS. 9-12 provide another example of a set of screen images that may be presented to a user during the process of creating and ordering a map, such as a wall map, to aid or enable the user to create, view and print (order) the map. In particular, the screens of FIGS. 9-12 provide a framework in which the user can easily navigate and keep track of the steps involved in the process of creating, viewing and ordering a customized map, such as a customized wall map. The user may start the process at a screen 200 of FIG. 9, in which an area 202 indicates the five general steps associated with the process of creating and ordering a customized map. In this case, the five steps are labeled as (1) Start, (2) Create Map, (3) Options, (4) Summary and (5) Check Out. Of course fewer, additional or different steps could be used and indicated in the area 202 if desired. The current step, in this case step (1), is highlighted, illustrated in a different color or otherwise indicated in the area 202 to inform the user of the identity of the step in which the user is currently involved.

Figure 9:

As can be seen in FIG. 9, the user may start the process of creating a customized map by entering a starting address in an address field 204. Alternatively, the user may select a link 206 to use a previously created or designed map that was stored in the system by the same or a different user. After specifying a specific address, city and state, a zip code, or other location indicator, the user may select a Next button 208 to move to the second step of the process, which then causes the system to provide the screen 209 of FIG. 10 to the user.

Figure 10:
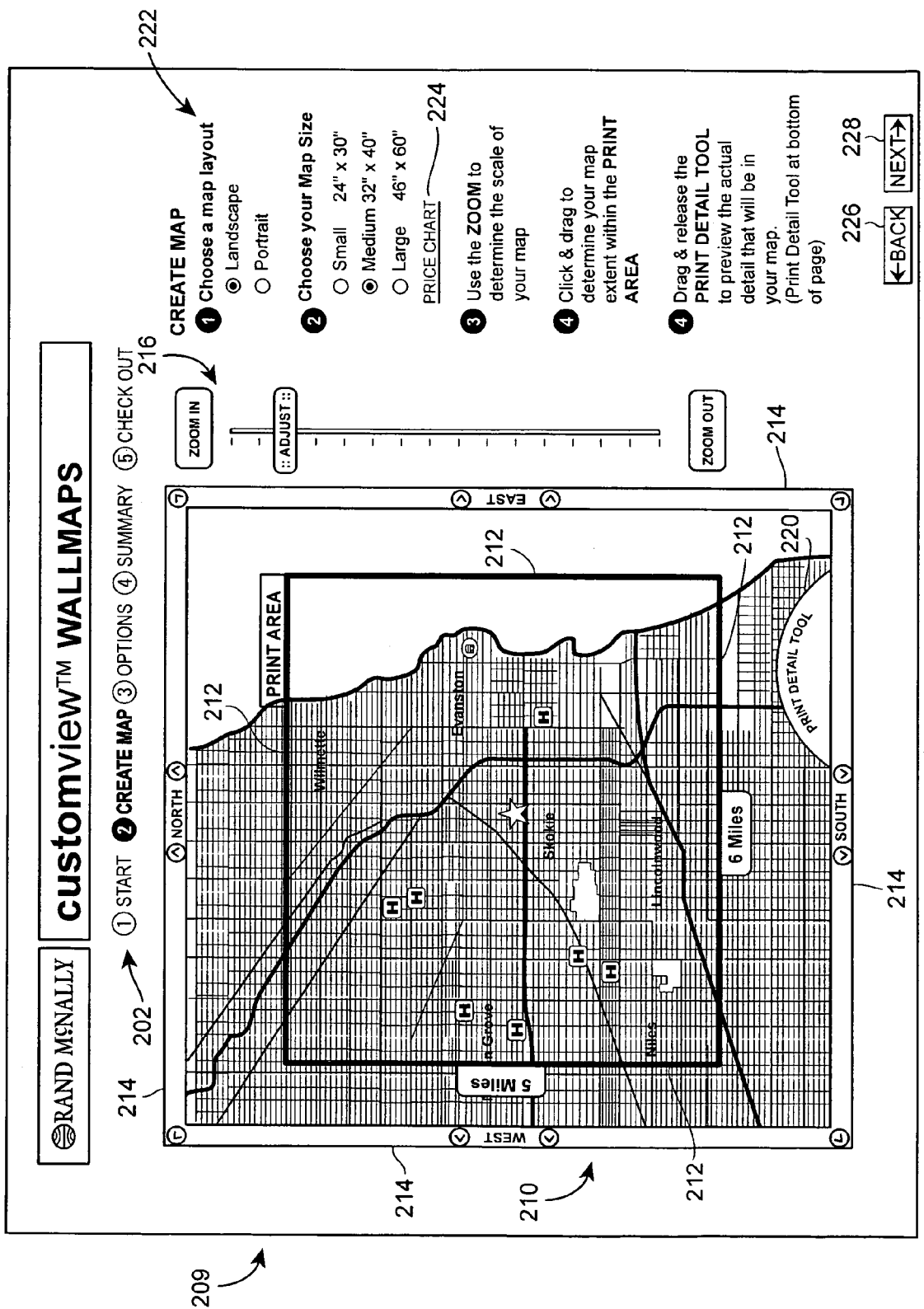

The screen 209 of FIG. 10 still includes the area 202, which now indicates that the user is in step (2) or the Create Map step. Here, an initial map 210, such as a wall map, is displayed based on the address or location specified by the user in step (1). The data for this map is obtained in any of the manners discussed previously. Similar to the description provided with respect to FIG. 4, the user may change the coverage area by dragging the map and moving it with respect to the map borders 212, may move to different coverage area by manipulating or selecting one or more viewing borders 214, may adjust the map detail (of the printed map) and/or the scale using the slider 216 and may view a different level or higher level of map detail, such as that to be actually printed on the map being created, using the print detail tool 220. In this example, the user may select parameters of the printed map, such as the map layout, map size, etc. using the selection buttons in an area 222 of the screen 200. If desired, one or more links, such as a link 224, may provide a link to other information, such as pricing information.

Figure 11:
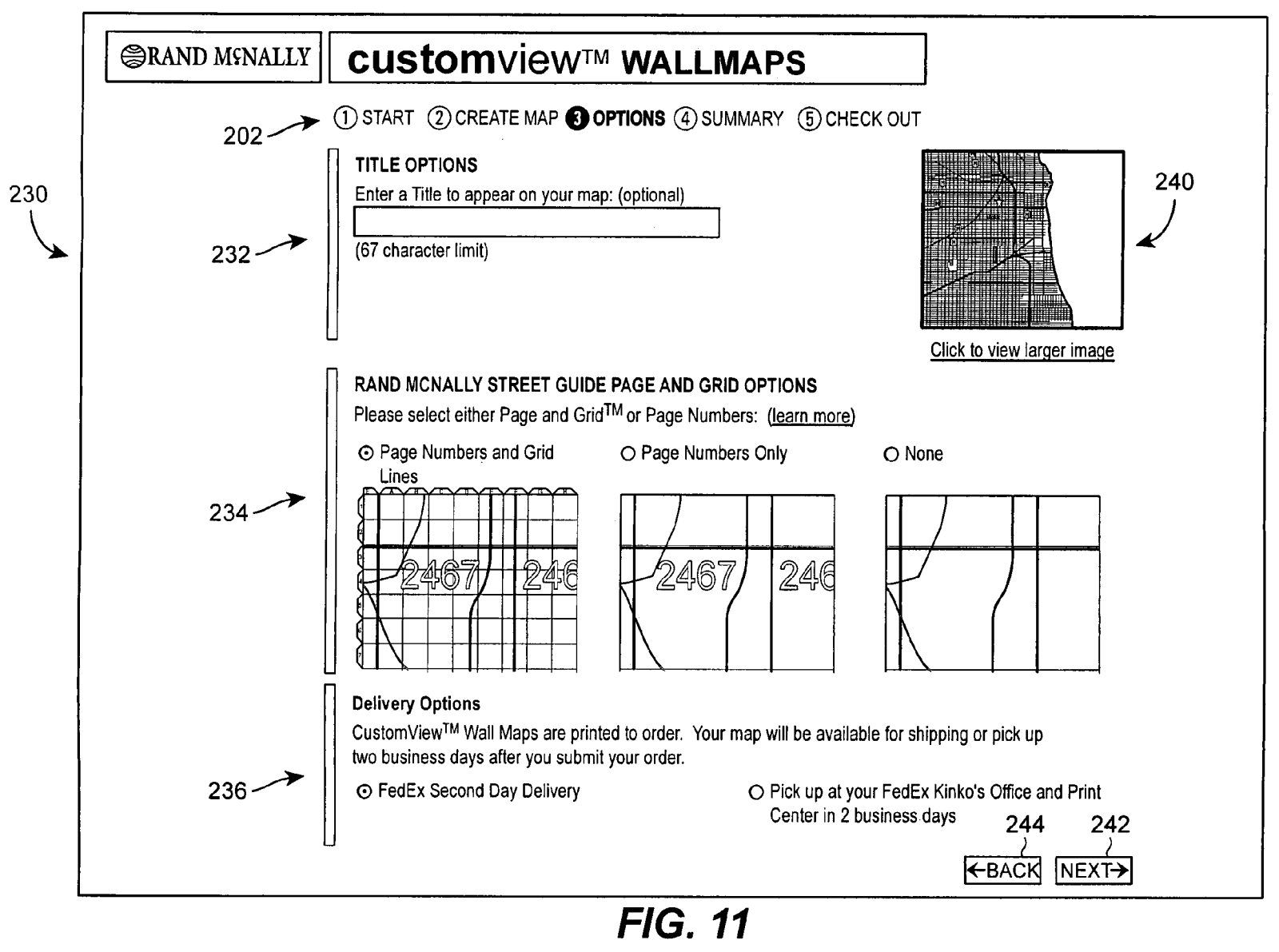

When in step (2), the user may go back to step (1) using the Back button 226 to select a different starting point or, after selecting the desired map coverage area and boundaries in step (2), the user may go to the next step using the Next button 228. FIG. 11 illustrates and example screen 230 which may be used to perform step (3) of the process, which includes specifying options for the map being created. In this case, the area 202 illustrates that the user is in step (3), and an area 232 allows the user to enter a title for the map. Likewise, an area 234 allows the user to specify whether the map is to be printed using page numbers and grid lines, page numbers only or no page numbers or grid lines. Examples of each are depicted in the section 234 to provide the user with information on each of these options. If desired, the availability of the page number and grid line options may vary depending on the scale of the map and the geographic region specified by the user. The system may prevent the user from selecting page number and grid line options in the screen of FIG. 11 if the user is requesting to make a map outside of a geographic area for which printed or commercially available street guides or books exist. The system may also prevent the user from selecting the page number and grid line options if the user is making a map at predefined scale or smaller (such as at zoom levels 1-4 of FIG. 10). In these cases, the page number and grid line option buttons in section 234 may be grayed out, and a note may be inserted near the buttons indicating that this option is not available.

Still further, a section 236 allows the user to specify delivery options, including for example, second day delivery by a courier, or a pick up at a print center. Of course, other delivery options may be provided here as well, including regular mail as an example. Still further, other options for the map, such as lamination, colors, etc. may be provided to the user or map designer in this screen. Also, a generic map preview section 240, in the form of a depiction of a small map, is provided to enable the user to view a preset or generic map to get a general idea of how the printed map may look.

Figure 12:
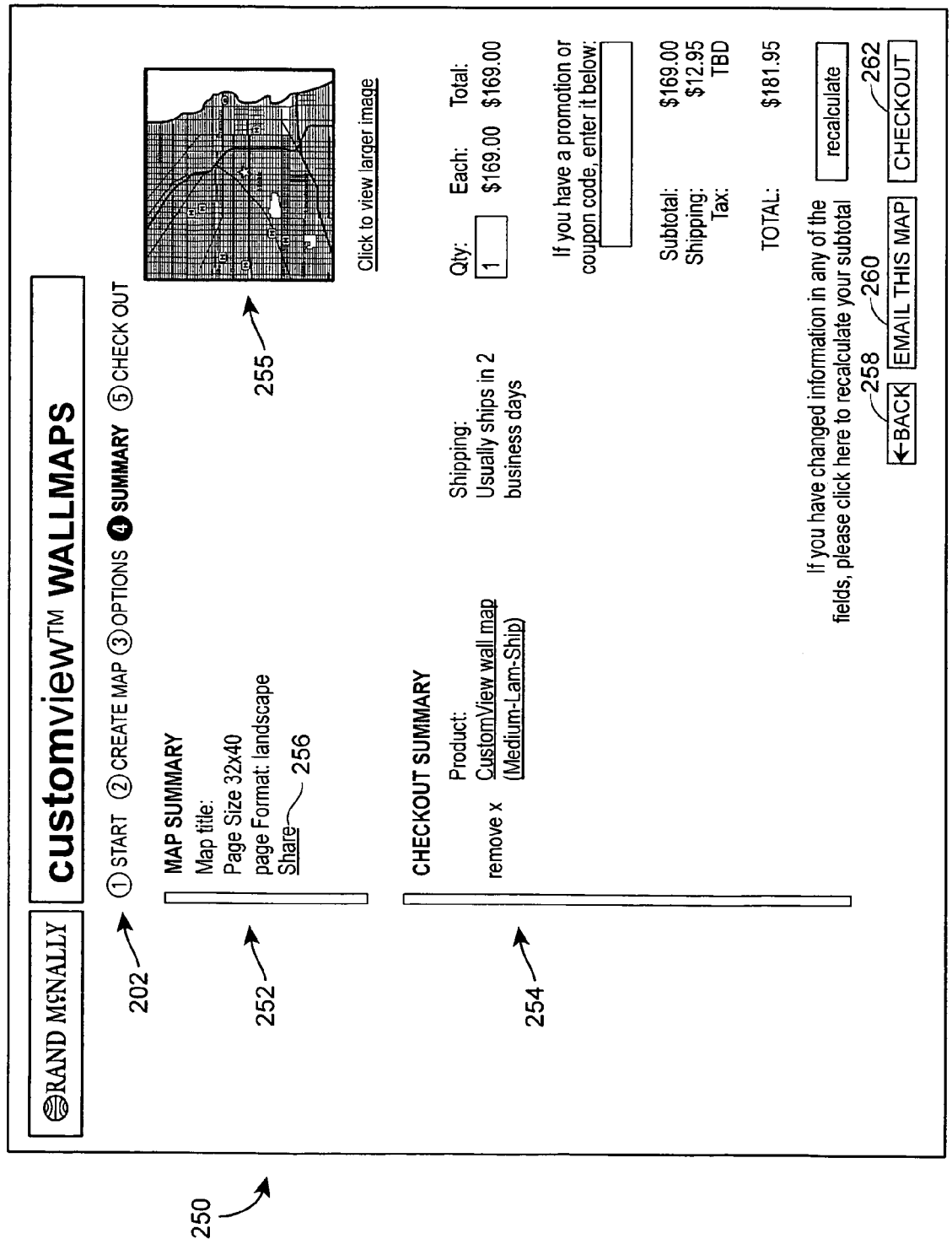

In any event, after specifying the options in the screen 230 of FIG. 11, the user may use the Next button 242 to move to the next steps of the process, which are illustrated in FIG. 12, or may use the Back button 244 to go back in the process to an earlier step. When going to the next step, the system generates a screen 250 of FIG. 12 which includes the area 202 in which step (4), the Summary step, is highlighted. The screen 250 also includes a map summary section 252 which provides the map title, size, page format, etc. and a checkout summary section 254 which shows the map or product to be ordered, the shipping specified, the quantity (which is changeable at this step by the user) and the price. The section 254 also allows the user to enter coupon codes, to recalculate the price based on the coupon code, etc. As illustrated in FIG. 12, the screen 250 also includes an actual map preview section 255 which enables the user to view, on the user interface, a version of the map at it currently stands or as it has been developed. When a user clicks on the map depiction in the map preview section 255, the system generates and presents to the user, preferably in another window, an image of the entire map created thus far or a portion of the map created thus far, including user specified information such as the map scale, boundaries, size, map title, page numbers and grid lines (if selected), etc. The print preview may also include the map marginalia or layout that will surround the map on the actual printed map. This map preview, depending on the size and detail level of the created map, may be a low resolution version of the printed map (i.e., less resolution than the print resolution) or may be of the same resolution. Additionally, a link 256 may be used to share the map with others, or to store the map data for future retrieval and use.

A button 258 may be used to move back in the creation process to change the map being created, while a button 260 may be used to e-mail the map or map data to someone else. Still further, a button 262 may be used to move to the final step, step (5) or the Checkout step. While no screen is illustrated herein for the Checkout step, any checkout procedure and/or screens could be used to enable the user to order and pay for the map the user has created. Preferably, such a screen would include a section 202 displaying the current step, and allow the user to move back to earlier steps in the process of creating and ordering a customized map, such as a wall map.

While the process of FIGS. 9-12 is slightly different in order and layout than the process of creating and ordering a customized map depicted in FIGS. 3-6, the same or essentially the same structure as depicted in FIGS. 1 and 2 can be used to implement the process of FIGS. 9-12. In particular, the system of FIGS. 1 and 2 can be modified to include the structure needed to create and display the map preview associated with the section 255 of FIGS. 11 and 12. In this case, the plot server 26 of FIG. 2 may be accessed prior to the user ordering the map and the plot server 26 and may used, along with the custom feature file 122, to generate the custom map. The plot server 26 may also then create a low resolution version of the created custom map, with the included custom features such as the title, page numbers, grid lines, user added markers, etc. and can scale or design this low resolution map for viewing on an electronic user interface, such as a computer display screen. The plot server 26 can then send this map preview, e.g., a low resolution version of the created map, to the image server 12 for delivery and display to the user at the user interface or web client 14 (FIG. 1). In one case, an additional or higher speed map print preview rendering engine may be stored on the plot server 26, along with a copy of all the data stored on the map data base server 20 of FIG. 1. This data may be compressed into an optimal format for size and performance for the print preview rendering engine. The print preview rendering engine need not necessarily perform all of the rendering effects that are performed in ARC GIS server 156 and the Pit Stop software 158 of FIG. 2, as the low resolution image to be displayed on a computer monitor at the user interface may not need to include all of these effects. By using such a high speed print preview rendering engine, the system may be able to generate the print preview map image in seconds, as opposed to using the plot server software used for the printed map, which might typically take minutes to tens of minutes to render a map.

Using the electronic wall map printing system described herein, a user may select, design and customize a map, such as a wall map, to be printed for the user according to the user's needs in a manner that enables the user to visualize the map to be printed at both a low level of detail or resolution and a high level of detail or resolution (e.g., at the level of detail that will actually printed on the map) during the design process. This process also allows the user to preview the map by viewing a low resolution version of the map on the user interface with the user added features, such as a title, scale, marked location(s), page numbers and grid lines, etc. In particular, the map design and printing system 10 described herein provides a produce-to-order, customer defined map that is created using fully automated online computer technology in which the customer may select or design the map content, the map coverage area, the map size and layout (e.g., orientation), customized map titling, finishing options such as paper type and lamination, delivery options, customized icons, symbols, colors, and fonts, customized points, lines, polygons and other printed elements, the map scale, etc., resulting in a printable map file to be sent to a remote location via an automated procedure. Furthermore, because the wall map is created using the same data used to create other published maps, the wall map is capable of visually matching the "look and feel" of printed map books sold via, for example, standard commercial retail distribution channels and of cross-referencing with such books or maps via a common or shared indexing system.

As described above, the wall map design and printing system 10 can print more map detail than is shown on the user interface or screen during the design process, and employs an automated process for optimizing map content (including but not limited to detailed street level information) taking into consideration the coverage area and map sizes so as to ensure that the end product is readable and functional. Additionally, the wall map design and printing system 10 is capable of providing a preview of the map detail to be included in the printed wall map using a "magnifying glass" or print detail tool on the design interface screen. As a result, the wall map design and printing system 10 employs an automated process for concurrently managing two or more levels of map detail to facilitate display of the wall map being designed both on a user interface and in print. Likewise, the wall map design and printing system 10 is capable of adjusting its settings to facilitate printing maps on different printers with different (varying) size output and different specifications for print resolution (e.g., dpi), media types, color systems, and ink types. Additionally, the wall map design and printing system 10 enables a user or customer to choose map pick-up locations based on, for example, an automated selection of locations based on the geographic area chosen by the customer for map coverage, geographic proximity searching using an address or location specified by the customer, and the type or quality of print services desired or specified by the user such as lamination, media type, size, ink type, etc. The wall map design and printing system 10 also enables a user to select or determine the "look and feel" of the wall map based on the locations defined by the user in order to allow the wall map presentation to adapt to regional or local cartographic preferences and, in any event, creates a printable map file at a production server based on limited summary information collected from a user interface using a fully automated interface means. Thus, as will be understood, the wall map design and printing system 10 described herein allows a user to electronically create and customize a wall map, to be delivered or picked up by the user, without actually having to discuss his/her desires or needs with a map provider representative.

Of course, while the electronic wall map design and printing system 10 described herein is described as using particular types of servers, particular file formats and communication programs, other software and hardware and other types of file and communication formats may be used instead of or in addition to those described herein to implement this system.

Moreover, while the wall map design program and associated components described herein are preferably implemented in software stored in and executed in, for example, a server or other computer, they may alternatively or additionally be implemented in other hardware, firmware, etc., as desired. If implemented in software, the programs described herein may be stored in any computer readable memory such as on a magnetic disk, a laser disk, or other storage medium, in a RAM or ROM of a computer, etc. Likewise, this software may be delivered to a user or a device via any known or desired delivery method including, for example, over a communication channel such as a telephone line, the Internet, etc. Also, while the wall map design program and the wall map design and printing system 10 is described in detail to be used in conjunction with a public communication network, it should be noted this program and system could be used in other environments, including communication environments not accessible by the public.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A map generation system for creating a printed map, the system comprising:
   a computer readable memory;
   a map database that stores map data;
   a selection routine that, when executed on a processor, enables a user at a user interface to specify a selected map area to be displayed in a printed map which is to be printed using a particular level of geographic detail;
   a first routine stored on the computer readable memory that, when executed on a processor, accesses the map database to obtain map data pertaining to the selected map area;
   a second routine stored on the computer readable memory that, when executed on a processor, displays on the user interface a map depicting the selected map area using a first level of geographic detail; and
   a third routine stored on the computer readable memory that, when executed on a processor, displays on the user interface a portion of the selected map area using a second level of geographic detail without altering the selected map area, the second level of geographic detail including more geographic detail than included in the first level of geographic detail, the second level of geographic detail including the same level of geographic detail as the particular level of geographic detail.

2. The map generation system of claim 1, wherein the second level of geographic detail is a level of geographic detail to be used to print the printed map on a substrate.

3. The map generation system of claim 2, wherein the selection routine enables a user to specify an address and a size of the selected map area to select the selected map area.

4. The map generation system of claim 2, wherein the second routine executes to display a map boundary defining a boundary of the selected map area to be used as the boundary of the printed map.

5. The map generation system of claim 4, wherein the second routine execute to display an indication of a size associated with the selected map area.

6. The map generation system of claim 2, wherein the second routine executes to enable the user to move one or more boundaries associated with the selected map area to redefine the selected map area.

7. The map generation system of claim 6, wherein the second routine executes to enable the user to shift the map boundaries over a different section of map area while keeping the size of the selected map area constant.

8. The map generation system of claim 6, wherein the second routine executee to enable the user to increase or decrease the size of the selected map area in a proportional manner.

9. The map generation system of claim 2, wherein the third routine executes to display a magnification indicator over the selected map area and to enable the user to select the portion of the selected map area to be displayed at the second level of geographic detail.

10. The map generation system of claim 1, wherein the second and third routines execute to simultaneously display on the user interface both the portion of the selected map area at the second level of geographic detail and another portion of the selected map area at the first level of geographic detail.

11. The map generation system of claim 1, further including a fourth routine stored on the computer readable memory that, when executed on a processor, to enables a user to add one or more features to the printed map.

12. The map generation system of claim 11, wherein the one or more features includes one of a title for the printed map, an icon to be placed at a particular location within the printed map, and one or more radius circles to be placed on the printed map.

13. The map generation system of claim 1, further including a fourth routine stored on the computer readable memory that, when executed on a processor, enables a user to select one or more print features to be used to print the printed map.

14. The map generation system of claim 13, wherein the one or more print features includes at least one of the specification of a print facility at which to print the printed map, whether to laminate the printed map when printed, the orientation of the printed map with respect to a substrate on which the printed map is to be printed, and the physical size of the printed map when printed.

15. The map generation system of claim 14, wherein, when executed on a processor, the fourth routine displays a list of possible print facilities and enables a user to select one of the possible print facilities as the print facility to print the printed map.

16. The map generation system of claim 1, wherein the map database includes indications of a plurality of map areas defining a plurality of publicly available printed maps, wherein the selected map area includes a multiplicity of the map areas associated with the publicly available printed maps and further including a fourth routine stored on the computer readable memory that, when executed on a processor, causes the printed map, when printed, to include indications of the multiplicity of map areas associated with the publicly available printed maps.

17. The map generation system of claim 16, wherein, when executed on a processor, the fourth routine causes the printable map, when printed, to include boundaries associated with the publicly available printed maps.

18. The map generation system of claim 1, wherein the first routine includes a routine that enables a user to select a particular level of map detail to be used to print the printed map.

19. A method of generating a printed map, the method comprising:
   enabling a user at a user interface to specify a selected map area to be displayed in a printed map which is to be printed using a particular level of geographic detail;
   displaying the selected map area on the user interface at a first level of geographic detail; and
   displaying a portion of the selected map area on the user interface at a second level of geographic detail without changing the boundaries of the selected map area, the second level of geographic detail including more geographic detail than included in the first level of geographic detail, the second level of geographic detail including the same level of geographic detail as the particular level of geographic detail.

20. The method of generating a printed map of claim 19, including printing the selected map area as a printed map using the second level of geographic detail.

21. The method of generating a printed map of claim 19, wherein enabling the user to specify a selected map area includes enabling the user to select an address or a location to be included in the selected map area and enabling the user to select a size for the selected map area.

22. The method of generating a printed map of claim 19, further including enabling the user to change the selected map area by enabling the user to move a boundary of the selected map area on the display of the selected map area at a first level of geographic detail.

23. The method of generating a printed map of claim 19, further including enabling the user to change the selected map area by enabling the user to proportionally change multiple boundaries of the selected map area on the display of the selected map area at the first level of geographic detail to change the size of the geographical area associated with the selected map area.

24. The method of generating a printed map of claim 19, further including enabling the user to select a location at which the printed map is printed.

25. The method of generating a printed map of claim 19, further including enabling the user to select a manner of delivering the printed map to an intended recipient.

26. The method of generating a printed map of claim 19, wherein displaying the selected map area on a user interface at the first level of geographic detail includes displaying indications of the geographical area covered by the selected map area.

27. The method of generating a printed map of claim 19, wherein displaying a portion of the selected map area on the user interface at a second level of geographic detail includes displaying that portion of the selected map area on the user interface simultaneously with displaying portions of the selected map area on the user interface at the first level of geographic detail.

28. The method of generating a printed map of claim 27, wherein displaying a portion of the selected map area on the user interface includes enabling a user to move the portion of the selected map area displayed at the second level of geographic detail with respect to the portions of the selected map area being displayed on the user interface at the first level of geographic detail.

29. The method of generating a printed map of claim 19, further including enabling the user to add one or more features to the printed map via the user interface.

30. The method of generating a printed map of claim 19, further including enabling the user to print the printed map with indications of boundaries associated with one or more previously printed and commercially available maps.

31. A method of generating a printed wall map, the method comprising:
   storing map data in a map database at a first location;
   enabling a user at a second location to specify a selected map area to be printed on a wall map which is to be printed at a particular level of geographic map detail, to access map data that pertains to the selected map area via a publicly-accessible communication network, and to obtain and simultaneously view portions of the selected map area at first and second different levels of geographic map detail without altering the selected map area to be printed, wherein the second level of geographic map detail corresponds to the particular level of geographic map detail; and
   enabling the user to have the wall map printed at a third location using the second level of geographic map detail with data sent from the first location to the third location, without the data being sent through the second location.

32. The method of generating a wall map of claim 31, wherein enabling the user at the second location to access the map data includes enabling the user at the second location to access the map data via the internet.

33. The method of generating a wall map of claim 31, wherein enabling the user to have the wall map printed at the third location includes enabling the user to have the wall map printed at a commercial printing facility remote from the first location and the second location, with the commercial printing facility being communicatively connected to the first location via a publicly accessible communication network.

34. The method of generating a wall map of claim 33, wherein enabling the user to have the wall map printed at the third location includes enabling the user to select one of a plurality of possible commercial printing facilities at which to have the wall map printed.

35. The method of generating a wall map of claim 33, wherein enabling the user to have the wall map printed at the third location includes enabling the user to use the remote user interface to select a manner of delivery of the wall map from the commercial printing facility to an intended recipient.

36. The method of generating a wall map of claim 31, further including having the wall map printed at the third location with indications of boundaries associated with one or more commercially published printed maps.

37. The method of generating a wall map of claim 31, wherein enabling the user at the second location to access the map data and to obtain and view portions of the selected map area includes displaying portions of the selected map area at a first level of map detail on a user interface at the second location and displaying a portion of the selected map area at a second level of map detail on the user interface at the second location, wherein the second level of map detail has more map detail than the first level of map detail.

38. The method of generating a wall map of claim 37, wherein enabling a user to specify a selected map area to be printed includes providing the user with a display of the selected map area and enabling the user to manipulate the display electronic maps to change the geographical area to be printed on the wall map to be printed.

39. A method of creating a map, comprising:
   storing map data associated with a plurality of publicly available maps;
   enabling a person to select a geographical area to be covered by a map; and
   printing the map of the selected geographical area using stored map data associated with two or more of the plurality of publicly available maps, and printing the map with indications of the two or more of the plurality of publicly available maps and with index markings associated with the two or more of the plurality of publicly available maps.

40. The method of creating a map of claim 39, wherein printing the map includes printing the map to include indications of multiple boundaries of each of the two or more of the plurality of publicly available printed maps.

41. The method of creating a map of claim 40, wherein printing the map further includes printing the map with page numbers associated with each of the two or more of the plurality of publicly available printed maps.

42. The method of creating a map of claim 39, wherein printing the map includes printing the map as a wall map.

43. The method of creating a map of claim 39, wherein the publicly available maps are street maps.

44. A method of creating a map, comprising:
   storing map data associated with a plurality of publicly available maps;
   enabling a person to select a geographical area to be covered by a map; and
   printing the map of the selected geographical area using stored map data associated with two or more of the plurality of publicly available maps, the map being printed at the same level of map detail used to print the plurality of publicly available maps and including indications of the two or more of the plurality of publicly available maps.

45. A method of generating a printed wall map via a remote user terminal, comprising:
   enabling a user at a remote user terminal to specify a selected map area to be printed on a wall map which is to be printed at a particular level of geographic map detail;
   enabling the user to specify custom information to be printed on the wall map;
   obtaining map data pertaining to the selected map area from a map database;
   displaying a version of the printed map at the remote user terminal, the displayed version of the map including at least some of the custom information and showing different portions of the selected map area at first and second different levels of geographic map detail without altering the selected map area, wherein the second level of geographic map detail corresponds to the particular level of geographic map detail; and sending the data needed to print the wall map from the map database to a printing location without the data being sent through the remote user terminal.

46. The method of generating a printed map of claim 45, wherein enabling the user to specify the map area includes enabling the user to specify one of an address, a city or a zip code.

47. The method of generating a printed map of claim 46, wherein enabling the user to specify the map area includes enabling the user to specify one or more boundaries defining the map area.

48. The method of generating a printed map of claim 46, wherein enabling the user to specify custom information includes enabling the user to select a title for the printed map.

49. The method of generating a printed map of claim 46, wherein enabling the user to specify custom information includes enabling the user to select an icon to be placed on the printed map.

50. The method of generating a printed map of claim 46, wherein enabling the user to specify custom information includes enabling the user to select a scale marking for the printed map.

51. The method of generating a printed map of claim 46, wherein enabling the user to specify custom information includes enabling the user to select to place page numbers on the printed map.

52. A method of creating a printable map via a remote user terminal, comprising:
enabling a user to use a remote user terminal to specify one of an address, a city, or a zip code to select a map area to be depicted by the printable map;
enabling the user at the remote user terminal to specify custom information to be printed on the printable map, including enabling the user to select to place page numbers on the printable map, the page numbers being indexed to page numbers of one or more publicly available maps;
obtaining map data pertaining to the selected map area from a map database;
displaying a version of the printable map at the remote riser terminal, the displayed version of the printable map including at least some of the map data pertaining to the selected map area from the map database and the custom information; and
enabling the user to have the printable map automatically printed from the remote user terminal.

53. The method of generating a printed map of claim 46, wherein enabling the user to specify custom information includes enabling the user to select to place grid lines on the printed map.

54. The method of generating a printed map of claim 46, wherein displaying a version of the printed map at the remote user terminal includes displaying a low resolution version of the printed map, the low resolution version of the printed map being lower in resolution than the printed map when printed.

55. The method of generating a printed map of claim 54, further comprising enabling the user to have the printed map printed at a print site remote from the user terminal and remote from the map database.

56. The method of generating a printed map of claim 55, wherein the print site is a third party commercial printing facility.

* * * * *